Patented July 20, 1954

2,684,297

UNITED STATES PATENT OFFICE 2,684,297

PROCESS FOR MELTING HIGHLY REACTIVE METALS

Stephen F. Urban, Kenmore, N. Y., assignor to National Lead Company, New York, N. Y., a corporation of New Jersey No Drawing. Application August 4, 1951,
Serial No. 240,445

7 Claims. (Cl. 75—84)

This invention relates to highly-reactive, high-melting metals of group IV of the periodic system of elements and is particularly concerned with the melting or fusion of such metals.

Such group IV metals, for example, titanium, zirconium and hafnium, are ordinarily produced in the form of a powder or as a porous spongy mass by reduction of a compound thereof. While the powder or sponge form of the metal may be consolidated by heat and pressure to give fairly dense metal compacts, for many purposes denser, homogeneous, fused ingots are desired. However, prior to the present invention, a serious problem has existed in melting these metals since, as they are highly reactive at or even below their melting points with practically all common refractory materials, containers used for melting the metals were attacked and eroded and the fused metal was badly contaminated by dissolved constituents of the refractory container.

According to the present invention, group IV metals such as titanium, zirconium, hafnium and alloys of such metals are fused while held in a refractory vessel or container such as a crucible, hearth or the like formed of refractory material having a composition corresponding to the general formula $MO \cdot ZrO_2$ where M is calcium, strontium, barium or magnesium or a mixture thereof. It has been discovered that such refractories are very resistant to attack by molten metals of the group above mentioned and that as a consequence when such metals are fused in these refractories, the amounts of undesired impurities picked up from the container are greatly reduced.

Formation of refractory containers of the compositions indicated above may be carried out in several ways using either a product previously formed by calcining or sintering the oxide of the selected bivalent metal or metals with zirconium oxide at temperatures ranging from about 2150° F. to the melting point of the mixtures, or a mechanical mixture of the MO oxide or oxides with zirconia. In the latter case, of course, the subsequent firing of the refractory article produces combination of the oxides. Typical examples of the production of crucibles of oxide combinations within the scope of the invention are given below:

*Example I*

An intimate mixture of finely divided calcium oxide and zirconia in a ratio by weight of 31.3:68.7 was calcined for 1 hour at a temperature of 2800° F. The product, having the composition $CaO \cdot ZrO_2$, and believed to be essentially calcium zirconate, was milled to pass through a No. 325 screen and a batch of the following composition was prepared:

|  | Parts |
|---|---|
| $CaO \cdot ZrO_2$ | 100 |
| High molecular weight, water soluble wax (e. g. "Carbowax" 4000) (dissolved in water) | 10 |
| Methyl cellulose (dissolved in water) | 1.5 |

The ingredients of the above batch were thoroughly mixed and the mixture was then permitted to dry at a temperature not higher than 150° F. until it could be formed into a granular mass by passing it through a No. 20 screen. The granular mixture was then pressed in a steel die at approximately 50,000 p. s. i. pressure to form a crucible. After air drying, the green crucible was slowly heated to 800° F. during which time the methyl cellulose and wax were evaporated or burned out. The crucible was then heated more rapidly to 3150° F., held at that temperature for about an hour, and cooled slowly in the furnace. Instead of the wax and/or methyl cellulose, which were employed to improve flow in the mold during pressing of the crucible and also to give strength to the green crucible, stearic acid, polyvinylalcohol, or other known temporary binders may be used.

The crucible manufactured in the manner described above was used as a container for the fusion of a charge of titanium powder in an induction furnace under vacuum. Although the crucible after the fusion was somewhat discolored, there was no apparent erosion thereof and analysis of the fused titanium showed practically no contamination, the impurity pick-up being only 0.05% Ca and 0.01% Zr.

It will be understood that the contamination mentioned results from reduction of the oxides of the crucible refractory by the molten metal, i. e. zirconium, titanium or hafnium, with accompanying formation of the oxide of the fused metal. In many cases the metallic impurities are themselves not particularly harmful, but presence of even quite small amounts of oxygen is deleterious to the working properties of the metal.

Thus it is extremely important to maintain the impurity pick-up from the refractory so low that the amount of oxygen simultaneously picked up therefrom is less than 0.75% and preferably less than 0.50%. Calculation shows that, when melting titanium for example, a pick-up of about 1.42% of zirconium is accompanied by the pick-up of about 0.5% of oxygen. It is evident, therefore, that the fused ingot obtained from the preceding example is of excellent purity with an oxygen content so low that the ductility of the titanium is quite satisfactory.

*Example II*

Another crucible was made in substantially the same way as in Example I, but using as the refractory material a product having the composition $SrO \cdot ZrO_2$ and obtained by calcining at 2800° F. for one hour an intimate mixture of 45.7 parts by weight of finely divided strontium oxide and 54.3 parts by weight of finely divided zirconia.

A charge of titanium powder was successfully melted in this crucible. After the fusion the crucible was discolored to some extent but showed evidence of only very slight attack. Analysis of the fused titanium revealed that the pick-up during fusion was only 0.01% Sr and 1.00% Zr.

*Example III*

Finely divided barium oxide and zirconia were thoroughly mixed together in a proportion by weight of 55.4:44.6 and calcined for one hour at 2800° F. The resultant product, having the composition $BaO \cdot ZrO_2$ was milled and a crucible was formed therefrom in substantially the same manner as set forth in Example I.

This crucible was used in melting a charge of titanium powder. After the titanium ingot was removed, the crucible was found to be somewhat discolored and eroded in a few spots, but from analysis of the titanium ingot which showed an impurity pickup in melting of only 0.01% Ba and 0.50% Zr, it was evident that attack of the crucible by the fused metal was slight.

*Example IV*

Magnesium oxide and zirconium oxide in finely divided form were admixed in a proportion by weight of 24.6:75.4 and the mixture was calcined at 2800° F. for one hour. The calcined product which may be represented by the formula $MgO \cdot ZrO_2$ was ground and used as the refractory material in forming a crucible by substantially the same method as that described in Example I.

The crucible thus formed was employed in melting a charge of titanium powder. After use the crucible was slightly discolored but was free from any evidence of attack. Analysis of the titanium ingot showed that the contamination of the titanium during melting was only 0.05% Mg and 0.01% Zr.

Although it is preferred to form crucibles from the refractory $MO \cdot ZrO_2$ products by pressing, other processes of forming refractory containers from such products may be used. As an instance, in the following example there is described the production of a refractory crucible by slip casting.

*Example V*

An intimate mixture of finely divided barium carbonate and zirconia in a ratio of 197 to 123 by weight was calcined for two hours at 2250° F., yielding a product which was essentially all a material having a composition corresponding to the formula $BaO \cdot ZrO_2$. The product was milled to pass a 325 mesh sieve and a portion of the milled material was compacted under pressure into blocks which were fired for 1 hour at 3150° F. These fired blocks were crushed and separated into several grain sizes for use as grog. A casting slip was prepared of the following formulation:

| | Parts |
|---|---|
| Milled $BaO \cdot ZrO_2$ | 80 |
| 60 x 80 mesh $BaO \cdot ZrO_2$ grog | 10 |
| 80 x 100 mesh $BaO \cdot ZrO_2$ grog | 5 |
| 100 x 120 mesh $BaO \cdot ZrO_2$ grog | 5 |
| $Na_6P_4O_{13}$ (deflocculant) | 0.016 |
| Water | 17.5 |

This made a fluid slip which was drain cast to a crucible shape by conventional ceramic procedure in a plaster of paris mold. After removal from the mold, the crucible was dried and fired at 3150° F.

This crucible was used as a container in fusing a charge of titanium powder to an ingot. After the titanium ingot was removed from the crucible, examination of the crucible revealed some discoloration and a little erosion. Analysis of the titanium ingot showed an impurity pick-up during fusion of only 0.01% Ba and 0.50% Zr. Consequently, it appears that attack of the crucible by the fused metal was only superficial.

Excellent results have also been obtained when melting titanium in refractory containers formed of refractory material according to the invention in which more than one of the bivalent metals, calcium, strontium, barium and magnesium is employed. This is illustrated in the following example.

*Example VI*

Products having the formulas $CaO \cdot ZrO_2$ and $MgO \cdot ZrO_2$ were formed by the methods described in Examples I and IV, respectively. A mixture of 94% of the first product and 6% of the second product was made and a crucible was manufactured therefrom substantially in accordance with the procedure set forth in Example I.

A charge of titanium powder was melted in the crucible thus obtained and the crucible was examined after use. The molten titanium had attacked the crucible to a minor extent in localized areas but analysis of the metal showed the attack to be insignificant since the impurity pick-up was only 0.02% Mg, 0.03% Ca and 0.30% Zr.

Other products which have essentially the formula $MO \cdot ZrO_2$ but in which the MO component is a mixture of at least two oxides of metals of the group consisting of calcium, strontium, barium and magnesium, such, for example, as BaO and MgO, SrO and MgO, and CaO and BaO, may be used in forming vessels or containers for fusing high-melting, highly reactive metals such as titanium, zirconium and hafnium.

As mentioned above, fusion of such metals in containers made of ordinary refractories is not satisfactory. The following examples are typical of experience with a common high temperature refractory and a product of composition similar to those of the present invention.

*Example VII*

A crucible was formed of zirconia stabilized by a small amount of lime in substantially the same manner as described in Example I. After fusing a batch of titanium powder therein the crucible was found to be extensively eroded and excessively contaminated. Analysis of the ingot showed an increase in impurities in the titanium of 10.0% Zr and 0.03% Ca.

*Example VIII*

Finely divided aluminum oxide and zirconium oxide in a ratio by weight of 101.9:123.2 were well mixed and calcined for one hour at 2800° F. to give a product having substantially the composition $Al_2O_3 \cdot ZrO_2$. This product was finely milled and formed into a crucible by substantially the same process as that set out in Example I.

The crucible thus obtained was used for fusing titanium powder but was most unsatisfactory since the molten metal picked up over 10% of both aluminum and zirconium and the crucible showed evidence of considerable reaction throughout.

In melting the reactive metal powder or sponge in the examples given above, the metal charge was placed in the refractory crucible. The latter in turn was placed on a non-reactive base or support preferably formed of magnesia or lime, within, but not in contact with, a conductive crucible, preferably formed of graphite. The assembled apparatus was then placed in a high frequency induction furnace which, after being sealed, was evacuated by a suitable pumping system to reduce the pressure in the furnace to less than 5 microns. Heating was then commenced and the temperature was raised slowly to the melting point of the metal. Throughout the heating period and the subsequent cooling, the furnace was connected to the vacuum pumping system to prevent reaction of the hot metal with air leaking into the furnace and to remove gases liberated from the metal, the crucibles, and the furnace interior.

Other methods and/or apparatus may, of course, be employed in melting titanium, zirconium, hafnium and alloys of these metals in containers of non-reactive, refractory $MO \cdot ZrO_2$ products of the type described herein. Thus, different types of furnaces and different heating means may be used. Further, the refractory materials may be formed in other shapes, for example, as hearths or as linings for containers made of less resistant refractory materials.

It will also be understood that the methods and conditions used in forming refractory shapes from the $MO \cdot ZrO_2$ products described in the present application may, if desired, vary from the description set forth in the examples in accordance with recognized ceramic practice. It is important, however, to maintain the metal or metals being fused in an inert atmosphere while hot. As used herein, the term "inert atmosphere" means either a high vacuum or an atmosphere of one or more of the rare gases such as helium, argon, etc.

In the foregoing description the refractory products which have been found to be unexpectedly useful in fusing highly-reactive, high-melting metals such as titanium, zirconium, and hafnium and alloys of these metals have been identified as having substantially the composition $MO \cdot ZrO_2$ where M represents at least one metal selected from the group consisting of calcium, strontium, barium, and magnesium. There is evidence that in at least some cases such products are composed substantially entirely of actual chemical compounds, i. e. meta-zirconates of the MO metals, while in other cases it appears that the products are, at least in part, solid solutions of one oxide in another. Nevertheless, whatever the actual chemical nature of the products, it has been ascertained that very satisfactory results in melting highly-reactive metals of the type mentioned have been obtained when such products have approximately the composition $MO \cdot ZrO_2$. A slight variation of the composition from the equimolal proportion of the formula may be permitted but neither of the constituents should vary more than about 5 molal percent.

Except as otherwise indicated, when reference is made herein to proportions or percentages, it is to be understood that proportions or percentages by weight are meant.

This application is in part a continuation of an application, Serial Number 52,398, filed October 1, 1948, by Stephen F. Urban, now abandoned.

I claim:

1. The process of fusing a metal chosen from the group consisting of titanium, zirconium and hafnium and alloys of such metals which consists in heating the metal above its melting point while maintaining it in contact with only an inert atmosphere and a refractory body having substantially the composition $MO \cdot ZrO_2$ where M is at least one metal selected from the group consisting of calcium, strontium, barium and magnesium.

2. The process of fusing a metal chosen from the group consisting of titanium, zirconium and hafnium and alloys of such metals which consists in heating the metal above its melting point while maintaining it in contact with only an inert atmosphere and a refractory body having substantially the composition represented by the formula $CaO \cdot ZrO_2$.

3. The process of fusing a metal chosen from the group consisting of titanium, zirconium and hafnium and alloys of such metals which consists in heating the metal above its melting point while maintaining it in contact with only an inert atmosphere and a refractory body having substantially the composition represented by the formula $SrO \cdot ZrO_2$.

4. The process of fusing a metal chosen from the group consisting of titanium, zirconium and hafnium and alloys of such metals which consists in heating the metal above its melting point while maintaining it in contact with only an inert atmosphere and a refractory body having substantially the composition represented by the formula $BaO \cdot ZrO_2$.

5. The process of fusing a metal chosen from the group consisting of titanium, zirconium and hafnium and alloys of such metals which consists in heating the metal above its melting point while maintaining it in contact with only an inert atmosphere and a refractory body having substantially the composition represented by the formula $MgO \cdot ZrO_2$.

6. The process of fusing a metal chosen from the group consisting of titanium, zirconium and hafnium and alloys of such metals which consists in heating the metal above its melting point while maintaining it in contact with only an inert atmosphere and a refractory body having substantially the composition represented by the formula $(CaMg)O \cdot ZrO_2$.

7. The process of fusing a metal chosen from the group consisting of titanium, zirconium and hafnium and alloys of such metals which consists in heating the metal above its melting point while maintaining it in contact with only an inert atmosphere and a refractory body which is essentially composed of the product obtained by heating together at temperatures above 200 F. substantially equi-molal proportions of the oxide of a metal selected from the group consisting of calcium, strontium, barium and magnesium and zirconium oxide.

References Cited in the file of this patent

UNITED STATES PATENTS

| Number | Name | Date |
|---|---|---|
| 1,862,191 | Meth | June 7, 1932 |
| 2,040,215 | Rava | May 12, 1936 |
| 2,205,854 | Kroll | June 25, 1940 |
| 2,231,945 | Pole | Feb. 18, 1941 |
| 2,306,349 | Wainer | Dec. 22, 1942 |
| 2,427,034 | Wainer | Sept. 9, 1947 |
| 2,466,138 | Wainer | Apr. 5, 1949 |
| 2,548,897 | Kroll | Apr. 17, 1951 |
| 2,568,237 | Lathe | Sept. 18, 1951 |

OTHER REFERENCES

Refining Precious Metal Wastes by Hoke, published 1940 by Metallurgical Publishing Co., page 304.